US007353075B2

(12) United States Patent
Aruga

(10) Patent No.: US 7,353,075 B2
(45) Date of Patent: *Apr. 1, 2008

(54) MANUFACTURING SYSTEM AND CONTROLLER, CONTROLLING METHOD, CONTROLLING SYSTEM, AND CONTROL PROGRAM FOR THE MANUFACTURING SYSTEM

(75) Inventor: Hisashi Aruga, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/478,491

(22) Filed: Jun. 29, 2006

(65) Prior Publication Data
US 2006/0247814 A1 Nov. 2, 2006

Related U.S. Application Data

(63) Continuation of application No. 10/635,243, filed on Aug. 6, 2003, now Pat. No. 7,146,235.

(30) Foreign Application Priority Data
Aug. 7, 2002 (JP) ............................. 2002-230286

(51) Int. Cl.
G06F 19/00 (2006.01)
G05D 9/00 (2006.01)
(52) U.S. Cl. .................. 700/110; 700/96; 700/108; 347/40
(58) Field of Classification Search ............... 700/96, 700/108, 110; 347/40
See application file for complete search history.

(56) References Cited

U.S. PATENT DOCUMENTS 5,554,891 A 9/1996 Shimizu et al.
5,896,292 A 4/1999 Hosaka et al.
6,025,012 A 2/2000 Matsuda et al.
6,061,603 A * 5/2000 Papadopoulos et al. ....... 700/83
6,130,682 A 10/2000 Kohno et al.
6,157,317 A * 12/2000 Walker ........................ 340/7.1
6,609,048 B2 * 8/2003 Matsuo et al. .............. 700/291
6,719,394 B2 4/2004 Kubota et al.
6,736,484 B2 5/2004 Nakamura (Continued)

FOREIGN PATENT DOCUMENTS

CN 86203570 10/1987

(Continued)

OTHER PUBLICATIONS

Communication from the Korean Intellectual Property Office regarding related application.

Primary Examiner—Michael D. Masinick
(74) Attorney, Agent, or Firm—Harness, Dickey & Pierce, P.L.C.

(57) ABSTRACT

A manufacturing system, located at a manufacturing system site, includes a discharger for discharging a liquid material having fluidity onto a substrate, communication means for transmitting and receiving data through a communication line, and monitoring means for monitoring the state of the discharger and for outputting data obtained by the monitoring through the communication means. The communication means provides communication between the monitoring means at the manufacturing system site and a server located outside of the manufacturing system site. The monitoring means receives a control command from the server through the communication means.

12 Claims, 5 Drawing Sheets

U.S. PATENT DOCUMENTS

| | | |
|---|---|---|
| 6,772,260 B2 | 8/2004 | Kawase et al. |
| 6,871,339 B2 | 3/2005 | Hasei |
| 6,877,844 B2 | 4/2005 | Usui |
| 6,921,148 B2 | 7/2005 | Nakamura et al. |
| 7,146,235 B2 * | 12/2006 | Aruga ........................ 700/110 |

FOREIGN PATENT DOCUMENTS

| | | |
|---|---|---|
| CN | 1075447 C | 11/2001 |
| CN | 1326146 A | 12/2001 |
| JP | 2000-148436 | 5/2000 |
| JP | 2001-293883 | 10/2001 |
| JP | 2001-358292 | 12/2001 |
| JP | 2002-1990 | 1/2002 |
| JP | 2002-5818 | 1/2002 |
| JP | 2002-7984 | 1/2002 |
| JP | 2002-032671 | 1/2002 |
| KR | 2001-98621 | 10/2000 |
| KR | 2002-0054698 | 7/2002 |

* cited by examiner

MANUFACTURING SYSTEM AND CONTROLLER, CONTROLLING METHOD, CONTROLLING SYSTEM, AND CONTROL PROGRAM FOR THE MANUFACTURING SYSTEM

CROSS-REFERENCE TO RELATED APPLICATIONS

This application is a Continuation of U.S. patent application Ser. No. 10/635,243 filed on Aug. 6, 2003 now U.S. Pat. No. 7,146,235. This application claims the benefit of Japanese Application 2002/230286, filed on Aug. 7, 2002. The disclosures of the above applications are incorporated herein by reference.

FIELD

The present invention relates to an inkjet manufacturing device (manufacturing system) for manufacturing, for example, color filters used in a liquid crystal device or the like by a method that includes discharging a liquid material having fluidity (inkjet method). In addition, the present invention relates to a controller for controlling the maintenance and use of the manufacturing device, a controlling method and a control program of the controller, and a controlling system using the controller.

BACKGROUND

In recent years, display devices, which are electro-optical devices, such as liquid crystal devices and electroluminescence devices (hereinafter referred to as EL devices), are widely used in display sections of electronic devices, such as cellular phones or portable computers. In addition, in recent years, such display devices often provide a full-color display. A full-color display in liquid crystal devices is achieved by transmitting light, which is modulated by a liquid crystal layer, for example, through color filters. The color filters are formed by disposing, for example, dot-shaped R (red), G (green), and B (blue) filter elements in a predetermined arrangement. Examples of such arrangements include a stripe arrangement, a delta arrangement formed or a mosaic arrangement, on a surface of a substrate formed of, for example, glass or plastic.

In a full-color display of an EL device, dot-shaped R (red), G (green), and B (blue) EL emissive layers are disposed in a predetermined arrangement. Examples of such arrangements include a stripe arrangement, a delta arrangement, or a mosaic arrangement found on a surface of a substrate formed of, for example, glass or plastic. Then, the EL emissive layers are interposed between a pair of electrodes in order to form pixels. After the pixels have been formed, a voltage applied to the electrodes is controlled for each pixel in order to cause the pixels to emit desired colors. As such, a full-color display is provided.

A conventional method for forming, for example, filaments or EL emissive layers, which are disposed in the form of dots, includes discharging filter element materials or EL emissive materials in the form of dots by an inkjet method when, for example, R, G, and B filter elements of the color filters are subjected to patterning. This method can also be used when, for example, R, G, and B pixels of the EL device are subjected to patterning. When the inkjet method is used, the process can be simplified and the costs of materials or the like can be reduced in comparison to when another method (photolithography method) is used. A conventional manufacturing device includes a discharger that uses the inkjet method for manufacturing products such as color filters (such a manufacturing device is hereunder referred to as an "IJ manufacturing device").

The discharger of an IJ manufacturing device has an inkjet head, which is a liquid drop discharging head. The waveform of a signal used to drive the inkjet contains the technological information of the manufacturing process of the IJ manufacturing device. These waveforms are ordinarily created individually in accordance with a client's product specification. For example, the material that is discharged from the inkjet head and the quality of a glass substrate to which the material is discharged can be varied. It may also be necessary to adjust the movement of the inkjet head in accordance with product specifications. As such, the waveforms are designed using know-how that has been obtained or created through experience. Therefore, waveforms have a large technological value. Consequently, if the waveforms are monitored without permission and the know-how of the waveforms is stolen, it can be seriously detrimental to the manufacturing device providers, such as the manufacturing device development manufacturers and leasing companies.

Notwithstanding, this problem may be overcome by, for example, stationing someone who works for a manufacturing device provider, such as a maintenance personnel, at a client's site and making him keep watch over the client to prevent leaks of the technological information. However, this approach is not realistic because cost for stationing such a person is high. For this reason, there is a demand for a system which can prevent the leaks of technological information from the IJ manufacturing device that is provided to the client.

In addition, as mentioned above, it is actually difficult to station maintenance personnel at the client's site. Therefore, there is also a demand for a system which allows maintenance at the proper time by ascertaining the state of the manufacturing device at the client's site.

In providing an IJ manufacturing device to the client, there is also a demand for a system which makes it possible to know whether or not the client is following the details of an agreement made between the manufacturing device provider and the client.

SUMMARY OF THE INVENTION

The present invention is achieved in view of such situations, and an object of the invention is to provide an inkjet manufacturing device (manufacturing system) which makes it possible to protect intellectual property by preventing technical information from leaking from the inkjet manufacturing device (IJ manufacturing device) which is provided to the client. It is another object of the present invention to provide a controller for controlling the maintenance and use of the manufacturing device, a controlling method and a control program of the controller, and a controlling system using the controller.

It is still another object of the present invention to provide an inkjet manufacturing device (manufacturing system) which can be maintained at a suitable time by ascertaining the state of the manufacturing device at a client's site, a controller for controlling the maintenance and use of the manufacturing device, a controlling method and a control program of the controller, and a controlling system using the controller.

It is still another object of the present invention to provide an inkjet manufacturing device (manufacturing system)

which makes it possible to ascertain whether or not the client is following the details of an agreement made between a manufacturing device provider and the client, a controller for controlling maintenance and use of the manufacturing device, a controlling method and a control program of the controller, and a controlling system using the controller.

As such, the present invention provides an inkjet manufacturing device having a discharger for discharging a liquid material having fluidity anything onto which the liquid material is to be discharged, communication means for transmitting and receiving data through a communication line, and monitoring means for monitoring the state of the discharger and for outputting data obtained by the monitoring through the communication means.

DETAILED DESCRIPTION OF THE PREFERRED EMBODIMENTS

Figure 1:
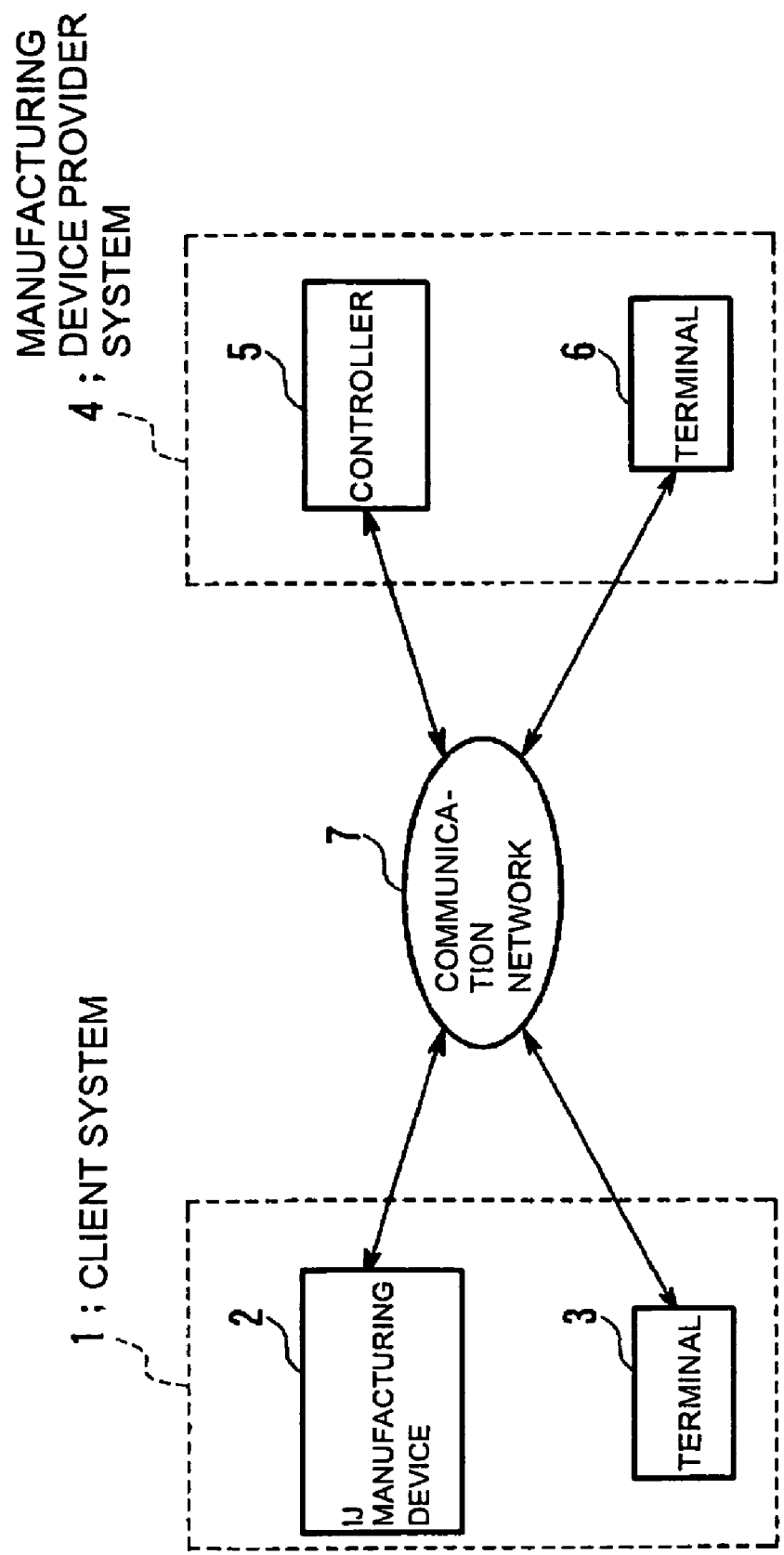
FIG. 1 is a block diagram of the overall structure of a controlling system for an inkjet manufacturing device (IJ manufacturing device) of an embodiment of the present invention.

A manufacturing system (an inkjet manufacturing device) of the present invention has a discharger for discharging a liquid material having fluidity onto anything which the liquid material is to be discharged, communication means for transmitting and receiving data through a communication line, and monitoring means for monitoring the state of the discharger and for outputting data obtained by the monitoring through the communication means.

Further, the prevent invention may be embodied, for example, in the following forms. In one form, the monitoring means determines whether or not an abnormality has occurred based on the monitor data, and outputs a warning signal by the communication means when an abnormality has occurred. In another form, when the monitoring means receives a control command through the communication means, the monitoring means controls the operation of the discharger in accordance with the control command. In still another form, the discharger comprises a liquid drop discharge head for discharging the liquid material, and a drive circuit for outputting a drive signal for controlling the discharging carried out by the liquid drop discharge head; and at least a drive signal input portion of the liquid drop discharge head and the drive circuit are shielded so as not to be accessible from the outside.

In still another form, the liquid drop discharge head is previously provided with a specific identification number; the discharger further comprises mounting detecting means for detecting any mounting of the liquid drop discharge head; and, when the monitoring means receives a detection signal from the mounting detecting means, the monitoring means reads and outputs the identification number. Moreover, the discharger further comprises discharge failure detecting means for detecting the discharging of the liquid material from the liquid drop discharge head when the drive signal is input and for detecting a discharge failure of the liquid drop discharge head when the liquid material is not discharged; and, when the monitoring means receives a detection signal from the discharge failure detecting means, the monitoring means determines that an abnormality has occurred, and outputs a warning signal.

Further, when the liquid drop discharge head comprises a plurality of nozzles for discharging the liquid material, the discharge failure detecting means is constructed so as to detect a discharge failure of each nozzle.

In still another form, the discharger outputs a notification signal indicating generation of a drive signal pulse, and the monitoring means outputs data for counting the cumulative number of dots discharged from the liquid drop discharge head based on the notification signal.

In still another form, the discharger has the function of measuring an operable state time of the liquid drop discharge head, the operable state time including time for actually discharging the liquid material and time for maintaining the liquid material in a dischargeable state and waiting for the discharging operation; and the monitoring means obtains and outputs the measured operable state time.

In still another form, the discharger has the function of counting the number of manufactured products, and the monitoring means outputs the count value.

In still another form, the discharger further comprises a storage container for storing the liquid material, and remaining amount detecting means for detecting a predetermined remaining amount of liquid material in the storage container; and, when the monitoring means receives a detection signal from the remaining amount detecting means, the monitoring means outputs a notification signal for notifying that the remaining amount of liquid material has decreased to the predetermined remaining amount.

In still another form, the manufacturing system further comprises removal detecting means for detecting removal of any predetermined part in the discharger; and, when the monitoring means receives a detection signal from the removal detecting means, the monitoring means determines that an abnormality has occurred and outputs a warning signal.

In still another form, a controller comprises communication means for transmitting and receiving data through a communication line; storage means for storing information of an agreement regarding a manufacturing device which is monitored; and controlling means for controlling the maintenance and use of the manufacturing device based on the agreement information and monitor data by receiving the monitor data or a warning signal from the manufacturing device by the communication means, by updating monitor data regarding the manufacturing device using the received monitor data, and by recording the updated monitor data in the storage means, and for outputting data regarding the manufacturing device.

In still another form, the controlling means outputs a command for controlling the manufacturing device by the communication means based on the content of the monitor data or the warning signal.

In still another form, the controlling means computes a manufacturing device royalty based on the number of manufactured products obtained from the manufacturing device.

In still another form, a method for performing a controlling operation comprises the steps of receiving monitor data or a warning signal through a communication line from a manufacturing device that is monitored; updating and recording monitor data of the manufacturing device using the received monitor data; controlling the maintenance and use of the manufacturing device based on information of an agreement regarding the manufacturing device which is previously recorded and the monitor data; and outputting data regarding the manufacturing device.

In still another form, a method for performing a controlling operation further comprises the step of outputting a command for controlling the manufacturing device through the communication line based on the content of the monitor data or the warning signal.

In still another form, a method for performing a controlling operation further comprises the step of computing a manufacturing device royalty based on the number of manufactured products obtained from the manufacturing device.

In still another form, a control program directs a computer to execute a process comprising the steps of receiving monitor data or a warning signal through a communication line from a manufacturing device that is monitored; updating and recording monitor data of the manufacturing device using the received monitor data; controlling the maintenance and use of the manufacturing device based on information of an agreement regarding the manufacturing device which is previously recorded and the monitor data; and outputting data regarding the manufacturing device.

In still another form, a control program directs a computer to execute a process further comprising the step of outputting a command for controlling the manufacturing device through the communication line based on the content of the monitor data or the warning signal.

In still another form, a control program directs a computer to execute a process further comprising the step of computing a manufacturing device royalty based on the number of manufactured products obtained from the manufacturing device.

By any of these control programs, the controller can be implemented using a computer.

In still another form, a controlling system is formed by connecting any one of the manufacturing systems, which makes use of an inkjet method, and any one of the controllers to a communication network which provides a data transmittable communication line.

Now, a description of an embodiment of the present invention will be given with reference to the drawings.

FIG. 1 is a block diagram of the overall structure of a controlling system for an inkjet manufacturing device (IJ manufacturing device) of the present invention. In FIG. 1, reference numeral 1 denotes a system of a client who is provided with the IJ manufacturing device. The client system 1 comprises an IJ manufacturing device 2 and a terminal 3. Reference numeral 4 denotes a system of a manufacturing device provider who provides the IJ manufacturing device 2. The manufacturing device provider system 4 comprises a controller 5 for controlling maintenance and use of the IJ manufacturing device 2, and a terminal 6.

Reference numeral 7 denotes a communication network which provides a communication line through which data can be transmitted. A telephone network, a leased line network, or a computer network the Internet may be used as the communication network 7. The IJ manufacturing device 2, the terminal 3, the controller 5, and the terminal 6 can be connected to the communication network 7. The IJ manufacturing device 2 and the terminals 3 and 6 can access the controller 5 through the communication network 7. For example, the controller 5 may be a server in which the IJ manufacturing device 2 and the terminals 3 and 6 are defined as being the client, so that a server-client system is formed.

The controlling system shown in FIG. 1 controls maintenance and use of the IJ manufacturing device 2 based on the details of an agreement made between the manufacturing device provider and the client for, for example, leasing the IJ manufacturing device 2. The details of the agreement prohibit the stealing of manufacturing technology information, using the device for purposes other than the agreement purpose, using parts in the device for other purposes or bringing them outside a client's site. For example, an inkjet head drive signal waveform monitor the technological information in the manufacturing process carried out by the IJ manufacturing device 2 in order to prohibit the use of the waveform in other devices. In addition, when the IJ manufacturing device 2 is a device for manufacturing color filters used in, for example, a liquid crystal device, the use of the manufacturing device for purposes other than the purpose of manufacturing the color filters can be prohibited. Further, using the parts (such as an inkjet head) that are incorporated in the IJ manufacturing device 2 in other manufacturing devices, or selling those parts can be prohibited. Using the controller 5, the manufacturing device provider can check whether or not these details of the agreement are being followed.

The manufacturing device provider can also obtain maintenance information using the controller 5 and use it for maintenance. For example, the manufacturing device provider can check the remaining amount of material (hereunder called "ink") that is discharged from the inkjet head and replenish the ink before the remaining amount of ink becomes an amount that hinders manufacturing. In addition, the manufacturing device provider can control, for example, the cumulative number of dots discharged from the inkjet head in order to, for example, replace the inkjet head before manufacturing problems arise. Further, the manufacturing device provider can control the state of the ink discharge from the inkjet head so that, if a discharge failure or the like ever occurs, the problem is overcome by, for example, quickly replacing the inkjet head.

Figure 2:
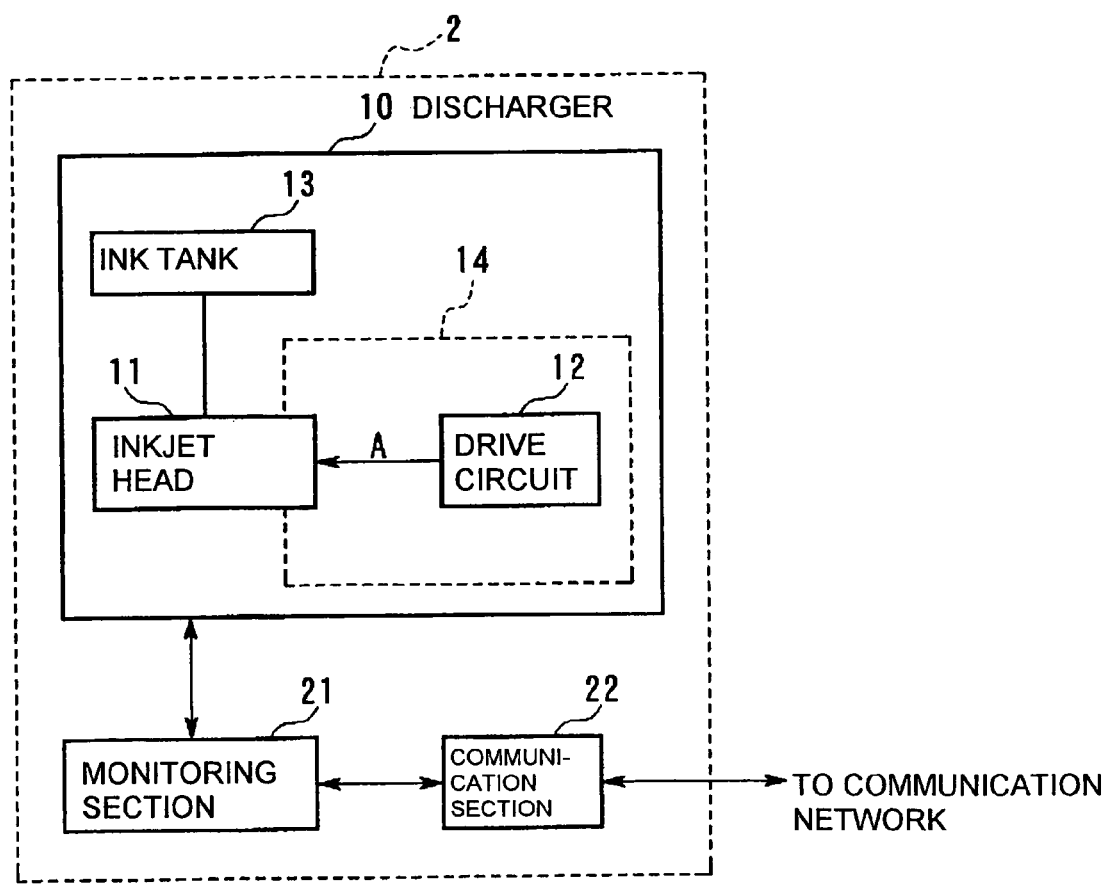
FIG. 2 is a block diagram of the structure of an IJ manufacturing device 2 shown in FIG. 1.

Now, a description of a specific structure of the controlling system for achieving these purposes will be given. FIG. 2 is a block diagram of the structure of the IJ manufacturing device 2 shown in FIG. 1. In FIG. 2, reference numeral 10 denotes a discharger for actually manufacturing products. Reference numeral 21 denotes a monitoring section that monitors the state of the discharger 10. The monitoring section 21 obtains various types of monitor data from the discharger 10. Reference numeral 22 denotes a communication section, which is connected to the communication network 7, for data communication with the controller 5. By the communication section 22, data, such as monitor data, can be transmitted to and received from the controller 5.

The monitoring section 21 may be formed of dedicated hardware, or simply include a memory and a CPU (central processing unit) that is loaded in the memory as a program and then executed.

The discharger 10 includes an inkjet head 11 for discharging ink in the form of dots by an inkjet method for forming filaments or EL emissive layers disposed in a dot arrangement. A drive circuit 12 for outputting a drive signal A that controls the discharging operation of the inkjet head 11, an ink tank 13 that stores ink which is supplied to the inkjet head 11, a cover 14 that covers part of the inkjet head 11 (that is, the part to which the drive signal A is input) and the drive circuit 12, a CPU (not shown) that controls each part of the circuit, and a memory (not shown) that stores various data and programs which the CPU executes are also included in the discharger 10.

Figure 3:
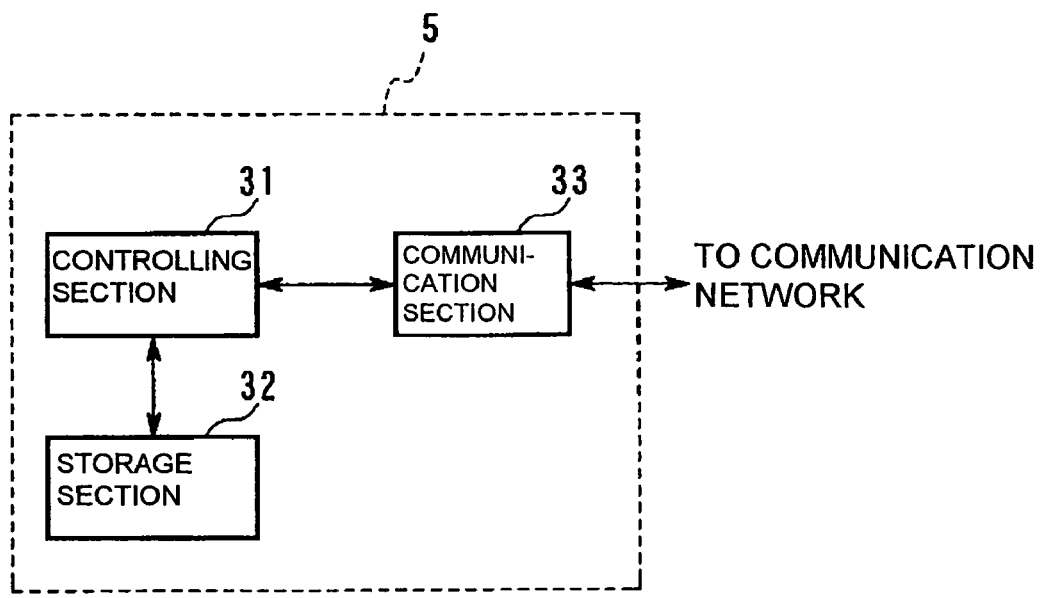
FIG. 3 is a block diagram of the structure of a controller 5 shown in FIG. 1.

FIG. 3 is a block diagram of the structure of the controller 5 shown in FIG. 1. In FIG. 3, reference numeral 31 denotes a controlling section that controls the maintenance and use of the IJ manufacturing device 2. Reference numeral 32 denotes a storage section that records various data. The storage section 32 can be accessed from the controlling section 31. Reference numeral 33 denotes a communication section that performs data communication with the IJ manufacturing device 2, the terminal 3, or the terminal 6 by being connected to the communication network 7. The communication section 33 makes it possible to perform transmission and reception of data to and from the IJ manufacturing device 2, the terminal 3, and the terminal 6, respectively.

As peripheral devices, an input device, a display device (neither of which are shown) and the like may be connected to the controller 5. Here, the term "input device" refers to a keyboard, mouse, etc. The term "display device" refers to a CRT (cathode ray tube), a liquid crystal display device, etc.

The controlling section 31 uses monitor data that it receives from the IJ manufacturing device 2 and records the monitor data of the IJ manufacturing device 2 in the storage section 32. Information of the details of the agreement made between the manufacturing device provider and the client is stored in the storage section 32. Based on the agreement information and the monitor data, the controlling section 31 controls the maintenance and use of the IJ manufacturing device 2.

The controlling section may be formed of dedicated hardware, or simply use a memory and a CPU (central processing unit) that is loaded in the memory as a program and executed.

Figure 4:
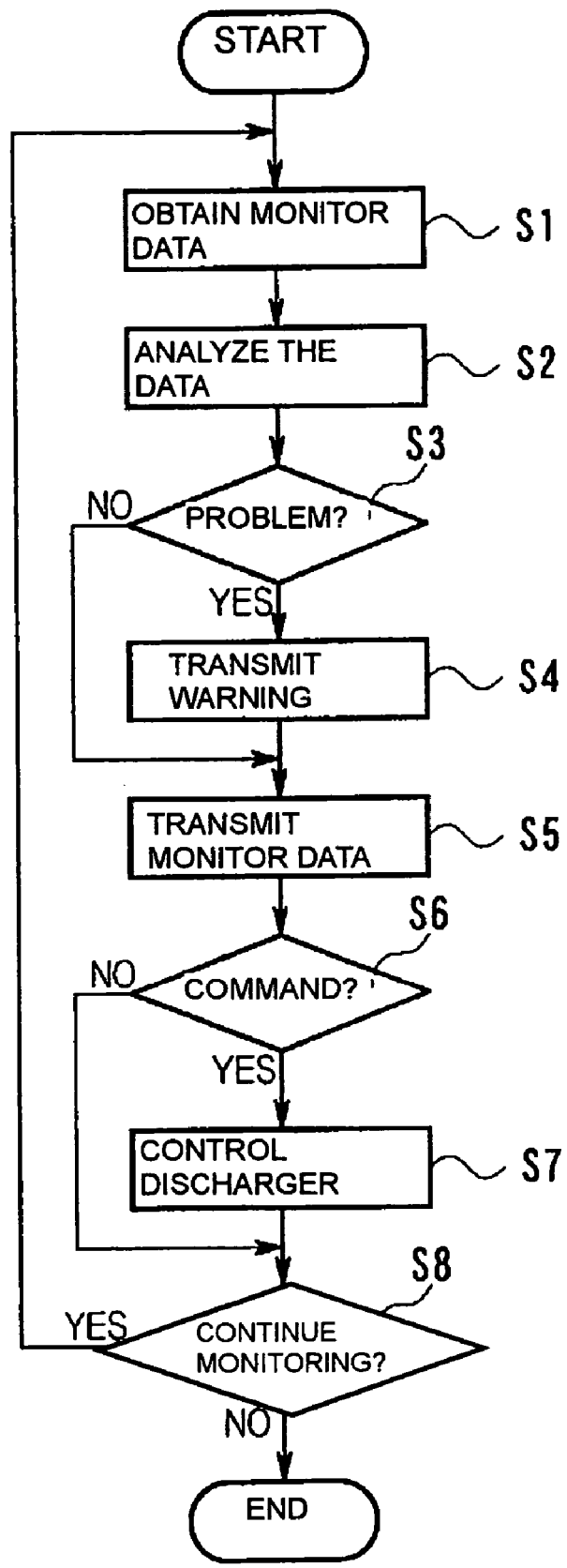
FIG. 4 is a flow chart showing a monitoring operation carried out by a monitoring section 21 shown in FIG. 2.

Next, a description of the overall monitoring operation carried out by the IJ manufacturing device will be given with reference to FIG. 4. FIG. 4 is a flow chart of the monitoring operation carried out by the monitoring section 21 shown in FIG. 2. First, the monitoring section 21 obtains monitor data from the discharger 10 (Step S1 in FIG. 4). The contents of the monitor data and items monitored by the monitoring section 21 will be described later. Next, the monitoring section 21 analyzes the monitor data that it has obtained (Step S2). If it determines that there is an abnormality (Step S3), it sends a warning of the abnormality content to the controller 5 through the communication section 22 (Step S4). On the other hand, if it determines that there is no abnormality (Step S3), the process proceeds to Step S5 (Steps S2-S4).

In Step S5, after the monitoring section 21 compiles the data in accordance with the monitored items, the monitoring section 21 sends the monitor data to the controller 5. Then, if it receives a control command from the controller 5 (Step S6), it controls the operation of the discharger 10 in accordance with the command content (Step S7). For example, it can render the discharger 10 operable or inoperable for the client. This is a useful measure when a breach of the agreement committed by the client is discovered. Next, if the monitoring section 21 is to continue monitoring (Step S8), the process returns to Step S1, whereas, if not (Step S8), the process ends (Steps S6-S8).

Figure 5:
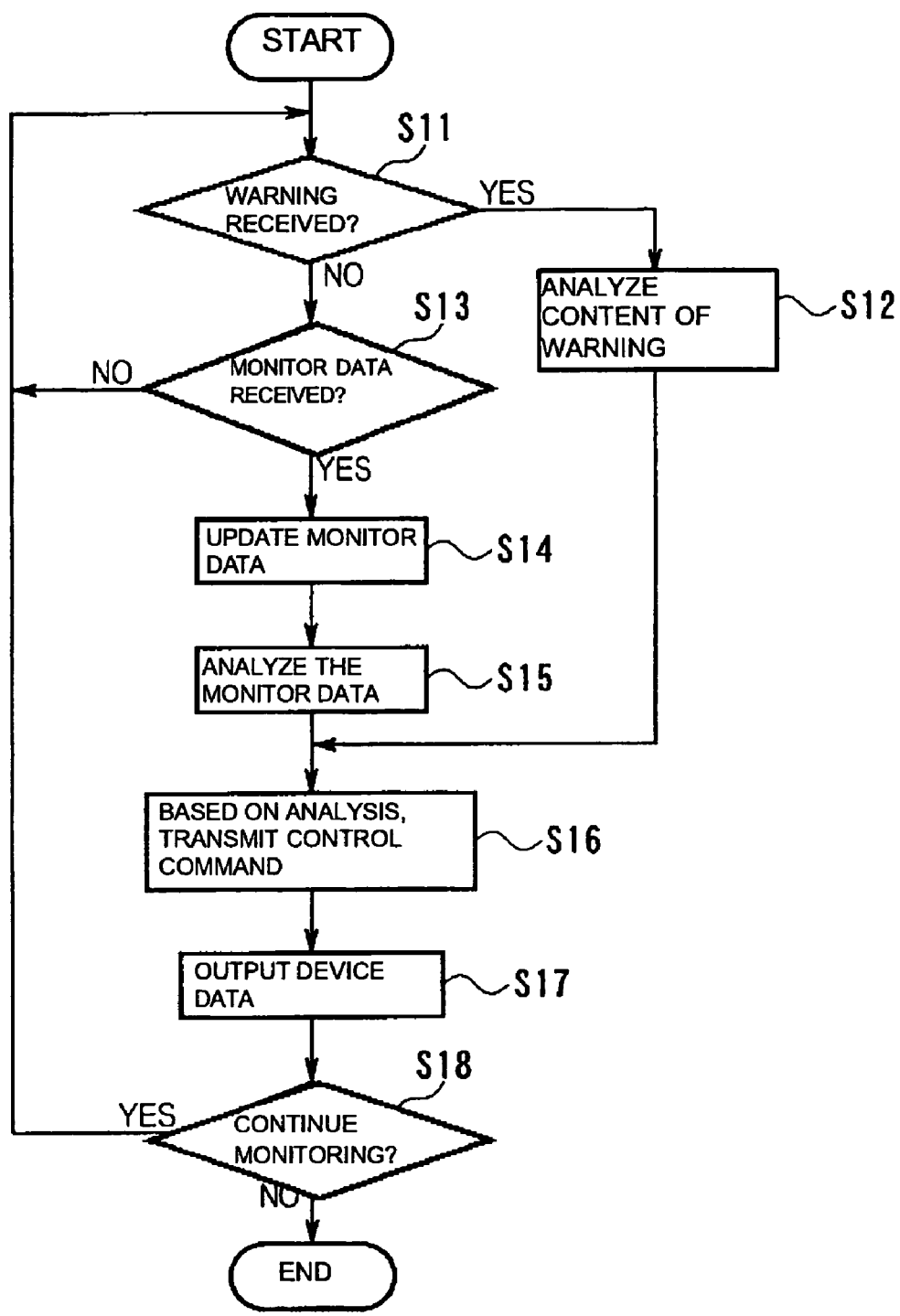
FIG. 5 is a flow chart showing a controlling operation carried out by a controlling section 31 shown in FIG. 3.

Next, a description of the overall controlling operation carried out by the controller 5 will be given with reference to FIG. 5. FIG. 5 is a flow chart of the controlling operation carried out by the controlling section 31 shown in FIG. 3. First, if the controlling section 31 receives a warning from the IJ manufacturing device 2 through the communication section 33, it analyzes the warning content (Steps S11 and S12 in FIG. 5). If it receives monitor data, it updates the monitor data recorded in the storage section 32 using the received monitor data, and analyzes the monitor data (Steps S13 to S15).

Next, if necessary, based on the analysis of the warning content or the monitor data, the controlling section 31 sends a command for controlling the discharger 10 to the IJ manufacturing device 2 through the communication section 33 (Step S16). Next, the controlling section 31 outputs information regarding the IJ manufacturing device 2, such as the warning content or the monitor data, to the display device (Step S17). The device information may be output to each of the terminals 3 and 6. Next, if the controlling section 31 is to continue controlling, the process returns to Step S11, whereas, if not, the process ends (Steps S16-S18).

Next, a description of the items monitored by the controlling system and the monitoring structure will be given. In the description below, data (signal) that the monitoring section 21 receives from the discharger 10 corresponds to the monitor data that the monitoring section 21 obtains from the discharger 10.

First, in the discharger 10, as mentioned above, part of the inkjet head 11 (that is, the part to which the drive signal A is input) and the drive circuit 12 are covered by the cover 14 so that the drive signal A cannot be monitored from the outside. In this way, by shielding at least the drive-signal-A inputting part of the inkjet head 11 and the drive circuit 12 so that they cannot be accessed from the outside, monitoring and stealing of the waveform of the drive signal A are prevented. In addition, a removal detecting sensor for detecting the removal of the cover 14 is disposed, so that, if the cover 14 is removed, the sensor detects the removal and outputs a detection signal to the monitoring section 21.

In addition, parts such as the inkjet 11 that are used in the discharger 10 and prohibited from being removed are also provided with removal detecting sensors. As such, if any of these parts is removed, the sensor detects the removal and outputs a detection signal to the monitoring section 21. The removal detecting sensors, for example, may be microswitches that turn on and off. These microswitches are disposed so that they inform the provider of the removal/mounting of the inkjet head 11 by on and off operations. Accordingly, it is possible to output the removal of the inkjet head 11 as a removal detection signal to the monitoring section 21 by an "on" state of the microswitch, and to output the mounting of the inkjet head 11 as a mounting detection signal to the monitoring section 21 by an "off" state of the microswitch.

When any of the aforementioned detection signals is input, the monitoring section 21 sends a warning of the removal/mounting to the controller 5. By the warning, the manufacturing device provider can know that the client has committed a breach of the agreement in using the IJ manufacturing device 2. As such, the stealing of technical information, the use of parts in the device for other purposes, or the bringing these parts outside the client's site can be prohibited.

The inkjet head 11 is also given a specific identification number (manufacturing number, etc.), and the manufacturing device provider stores the head identification number in the controller 5 and controls it. The identification number of the inkjet head 11 can be read from the monitoring section 21. For example, when the sensor detects that a inkjet head 11 has been mounted, the monitoring section 21 reads the identification number from the inkjet head 11, and the read head identification number is sent to the controller 5. When the controller 5 receives the head identification number, it compares the received head identification number with the head identification number that is stored in it. If the head identification numbers do not match, the controller 5 gives a warning that the head identification numbers do not match. By the warning, the manufacturing device provider can know that the inkjet head 11 of the IJ manufacturing device 2 has been secretly changed for another part. As a result, the manufacturing device provider can know that the client has done something which may result in breach of the agreement, such as the use of the inkjet head 11 for other purposes, the flow of the inkjet head 11 from the client's site, or the use of the removed part in an IJ manufacturing device used for manufacturing other products.

The discharger 10 also has the function of detecting the remaining amount of ink in the ink tank 13. For example, a liquid level sensor is disposed at a predetermined location in the ink tank 13, and when it detects that the amount of ink has decreased to the position of the liquid level sensor, it outputs a detection signal to the monitoring section 21. When the monitoring section 21 receives the detection signal, it notifies the controller 5 that the amount of ink has decreased to a predetermined amount. In this manner, the manufacturing device provider can know that the amount of ink in the IJ manufacturing device 2 has decreased to a threshold amount at which replenishment of ink is required. As such, it is possible to replenish the ink tank 13 with ink before the amount of ink hinders the manufacturing.

The discharger 10 also has the function of detecting any discharge failure of the inkjet head 11. For example, with an optical sensor that uses a laser or infrared light, the discharger 10 can detect that ink from the inkjet head 11 is discharged when the drive signal A is input. When ink is not discharged due to, for example, the clogging of a nozzle, the optical sensor detects the discharge failure and outputs a detection signal to the monitoring section 21. When the detection signal is input, the monitoring section 21 transmits a warning of the discharge failure to the controller 5. In this manner, the manufacturing device provider can know that a discharge failure of the inkjet head has occurred. As such, measures can be quickly taken to overcome this problem. Incidentally, the inkjet head 11 comprises a plurality of nozzles. It is desirable, therefore, that the discharge of ink from each nozzle is detected. This is because, by knowing the state of discharge from each nozzle, it is possible to efficiently analyze any failure in the inkjet head 11 that does not discharge ink properly.

Further, in order to count the cumulative number of dots discharged from the inkjet head 11, the drive circuit 12 can output to the monitoring section 21 a notification signal that indicates the generation of a drive signal A pulse each time the pulse is generated. The monitoring section 21 counts the notification signals, and transmits the count value to the controller 5 every time a predetermined time elapses. The controller 5 cumulatively increases the count value in order to determine the cumulative number of dots discharged. When the number of dots reaches a predetermined value at which the replacement of the inkjet head is required, the controller 5 gives a warning to notify the provider. By the warning, the manufacturing device provider knows that the inkjet head 11 of the IJ manufacturing device 2 is at the end of its life. As such, the provider can replace the inkjet head before a hindrance to manufacturing occurs.

Further, the discharger 10 can count the number of manufactured products. For example, a mechanical or an optical sensor may be disposed on a table that is used to set a glass substrate upon which ink is discharged to from the inkjet head 11. Each time a glass substrate is set on the table, the sensor detects this and outputs a detection signal to the monitoring section 21. The monitoring section 21 counts the detection signals. Alternatively, the discharger 10 may count the number of manufacturing operations and notify the monitoring section 21 of the number of manufacturing operations. The monitoring section 21 can then periodically (for example, daily) notify the controller 5 of the count value indicating the number of manufactured products. The controller 5 determines the cumulative number of manufactured products by cumulatively increasing the notified count value.

By this, the manufacturing device provider can ascertain the actual number of products manufactured by the client using the IJ manufacturing device 2. As a result, when the manufacturing device provider charges the client in accordance with the number of manufactured products, it is possible for the manufacturing device provider to determine whether or not the number of manufactured products presented by the client is correct, preventing the client from giving a wrong number of manufactured products. When the number of products that the client is allowed to manufacture according to the agreement is stored in the controller 5, and the controller 5 is adapted to give a warning when the cumulative number of manufactured products has reached the number of manufactured products allowed in the agreement, the manufacturing device provider can warn the client not to manufacture more products using the IJ manufacturing device 2 that will exceed the allowed number of products in the agreement, thereby making it possible to prevent improper use of the IJ manufacturing device 2.

The controller 5 may also be adapted to compute any royalties in accordance with the cumulative number of manufactured products, so that the client can pay the royalties as rent of the IJ manufacturing device 2 (including the cost of ink) to the manufacturing device provider. This is useful, for example, when an agreement is made between the manufacturing device provider and an ink manufacturer to pay for the ink in accordance with the cumulative number of manufactured products rather than the amount of ink used. In this case, the manufacturing device provider pays to the ink manufacturer for the ink from the royalty at a rate specified in the agreement. In this manner, it is possible to charge for the ink in terms of the actual number of manufactured products instead of the amount of ink used. As a result, since the cost of using the IJ manufacturing device corresponds to the actual number of manufactured products, it becomes easy for the client to do cost management. For this reason, the client's confidence in the manufacturing device provider increases. Even for the ink manufacturer, it is possible to improve the client's confidence in the ink manufacturer by paying for the ink in terms of the actual number of manufactured products instead of the amount of ink used.

The discharger 10 further has the function of measuring the time that the inkjet head 11 is in an operable state. The operable state time includes the time for actually manufacturing products by discharging ink, and the time for maintaining the ink in a dischargeable state and waiting for the discharging operation. The discharger 10 comprises a timer for measuring these times, and the monitoring section 21 reads the timer value and notifies the controller 5 of the timer value. The controller 5 cumulatively increases the notified timer value to determine the cumulative operable state time. In this manner, if the manufacturing device provider has agreed to an operable state time that can be used by the client stored in the controller 5, and the controller 5 is adapted to give a warning when the cumulative operable state time has reached the agreed upon operable state time, the manufacturing device provider can warn the client not to manufacture products using the IJ manufacturing device 2 when the agreed upon operable state time is being exceeded. As such, possible to prevent improper use of the IJ manufacturing device 2.

In the IJ manufacturing device 2, the monitoring section 21 may be adapted to simply transmit data obtained from the discharger 10 to the controller 5, so that the controller 5 only uses the data received from the IJ manufacturing device 2 for compiling operation, processing operations, and the like. Alternatively, the monitoring section 21 may be adapted to only hold data obtained from the discharger 10 in order to transmit the data in accordance with requests from the controller 5.

Further, the monitoring process may be performed in such a way that a program for executing each step carried out by the IJ manufacturing device 2 shown in FIG. 2 is recorded on a computer readable recording medium, the program recorded on the recording medium is read into a computer system, and the computer executes the program.

Further, the controlling process may be performed such way that a program for executing each step carried out by the controller 5 shown in FIG. 3 is recorded on a computer readable recording medium, the program recorded on the recording medium is read into a computer system, and the computer executes the program.

Here, the term "computer system" may refer to computers including hardware such as peripheral devices or operating systems (OSs). If the "computer system" uses a WWW system, the term also includes a homepage environment (or display environment).

The term "computer readable recording medium" refers to storage devices such as transportable media, including CD-ROM, ROM, a magneto-optical disk, a flexible disk, and hard disks incorporated in a computer system.

In addition, the term "computer readable recording medium" includes a storage device that holds a program for a certain period of time, such as RAM installed in a computer system which becomes a client or a server when a program is transmitted through a network such as the internet, or a communication line such as a telephone line.

The program may be transported from a computer system that stores the program in a storage device or the like to another computer system through a transmission medium or a transmission wave in the transmission medium. Here, the term "transmission medium" through which the program is transmitted refers to a medium which can transmit information, such as a network (communication network) including the internet, or a communication line including a telephone line.

The program may be used for executing some of the aforementioned functions. In addition, the program may be a difference file (difference program), which can implement the aforementioned functions together with a program already recorded in the computer system.

The inkjet head 11 of the discharger 10 used in the embodiment may be an inkjet head which discharges ink by making use of flexure deformation of a piezoelectric device, or an inkjet head having any other structure, such as an inkjet head which discharges ink bubbles that are generated by heat.

The inkjet head 11 may have nozzles that are disposed substantially linearly at substantially regular intervals and in a plurality of rows. Alternatively, it may have nozzles that are disposed neither at regular intervals nor linearly.

The use of the IJ manufacturing device 2 of the embodiment is not limited to the manufacturing of color filters, liquid crystal devices, and EL devices. It may be used for manufacturing various electro-optical devices having a substrate and for the step of forming a predetermined layer on the substrate, including electron-emitting devices, such as an FED (field emission display; a PDP (plasma display panel); an electrophoretic device, that is, a device for performing a displaying operation at each pixel by discharging ink (which is a functional liquid containing charged particles) into a recess between partition walls of the pixels, and applying voltage between electrodes that sandwich the pixels from above and below to move the charged particles towards one of the electrodes; and a thin Braun tube or CRT (cathode ray tube) display.

The IJ manufacturing device 2 may be used in manufacturing various devices having substrates, including electro-optical devices, and formed by discharging liquid drops (ink drops) onto the substrates. It may be used, for example, in a structure where a metallic wiring is provided by discharging a liquid metal, an electrically conductive material, a metal-containing coating material, or the like by the inkjet method in order to form the electrical wiring on a printed circuit board; in a structure where an optical member is formed by discharging fine micro-lenses on a substrate, using the inkjet method; in a structure where a resist, which is applied to a substrate, is discharged onto only a necessary portion of the substrate by the inkjet method; in a structure where a light-scattering plate is produced by forming very small white patterns or protrusions, used for scattering light, on a light-transmissive substrate formed of plastic or the like, by an inkjet discharging operation; and in a structure where a biochip is formed by discharging a specimen, an antibody, or DNA (deoxyribonucleic acid) on divided dot-shaped portions on a substrate by the inkjet method; that is, for example, RNA (ribonucleic acid) is discharged onto spike spots, which are arranged in a matrix on a DNA (deoxyribonucleic acid) chip by the inkjet method, a fluorescent labeling probe is prepared, and the DNA chip is subjected to hybridization.

In addition, the IJ manufacturing device may be used for any portions making up an electrical optical system of a liquid crystal device, such as an active matrix liquid crystal panel having active elements (for example, a TFD or a transistor such as a TFT) disposed at pixels. It may be used for a structure in which color filters are produced by forming division walls 6 that surround pixel electrodes and discharging ink into recesses defined by the division walls by the inkjet method; a structure in which electrically conductive filters are formed as color filters on pixel electrodes by discharging ink containing a color material and an electrically conductive material onto the pixel electrodes by the inkjet method; and a structure in which spacer grains for maintaining a gap between substrates are formed by an inkjet discharging operation.

The use of the IJ manufacturing device is not limited to color filters. It may also be used to manufacture EL devices, electron-emitting devices including FED and SED, and other electro-optical devices. The EL device may be formed, for example, as a stripe-type display device in which EL portions are formed into the shape of strips in correspondence with the three colors, R, G, and B; as an active display device comprising transistors for controlling current flow to light-emissive layers with every pixel as mentioned above; or as a passive matrix display device.

The embodiment of the present invention has been described in detail with reference to the drawings, however, specific structures are not limited to the structure of the embodiment, and changes in design and the like may be made within the gist of the present invention.

As described above, according to the present invention, the state of an inkjet manufacturing device (IJ manufacturing device) is monitored, and data obtained by the monitoring is output through a communication line. As a result, by obtaining the monitor data, the manufacturing device provider can know that the risk of leaking technological information from the IJ manufacturing device used at the client's site is occurring. By this, it is possible to obtain an advantage that the manufacturing device provider can prevent the leakage of technological information from the IJ manufacturing device with which the client is provided before it occurs, so that intellectual property can be protected.

In addition, it is possible to obtain an advantage that the maintenance of the manufacturing device can be performed at a suitable time by knowing the state of the manufacturing device at the client's site by the monitor data. Further, it is possible to obtain an advantage that by using the monitor data, the provider can check whether or not there is any breach of agreement and ascertain whether or not the client is following the details of the agreement made between the provider and the client.

Since, in the IJ manufacturing device, a determination is made as to whether or not an abnormality has occurred based on the monitor data, and a warning signal is output through the communication line if an abnormality has occurred, the manufacturing device provider can have an advantage in that they can immediately take measures against the client after receiving the warning signal.

When the IJ manufacturing device receives a control command through the communication line, the operation of the discharger is controlled in accordance with the control command. Therefore, the provider can take measures without going to the client's site.

Since at least the drive circuit and the drive signal input portion of the liquid drop discharge head are shielded so that they cannot be accessed from the outside, it is possible to prevent a drive signal waveform that has high technological value from being monitored and, thus, to prevent the know-how of the waveforms from being stolen.

Since, when the liquid drop discharge head is mounted, the identification number of the liquid drop discharge head is read and output, it is possible to know whether or not the liquid drop discharge head has been secretly replaced with another part by comparing the specific head identification number with that of the liquid drop discharge head which is actually mounted. As a result, the manufacturing device provider can know that the client has done something which may be a breach of agreement, such as the use of the inkjet head for other purposes, the bringing out of the liquid drop discharge head from the client's site, the use of the inkjet manufacturing device for purposes other than the agreement purpose when the secretly changed part is provided for manufacturing other products, and can take measures against it.

Since a warning signal is output when any discharge failure of the liquid drop discharge head is detected, it is possible for the manufacturing device provider to know that a discharge failure of the liquid drop discharge head in the IJ manufacturing device has occurred by the warning signal, and to quickly take measures against it, such as replacing the liquid drop discharge head.

When the liquid drop discharge head has a plurality of nozzles for discharging a liquid, discharge failure of each nozzle is detected, so that it is possible to know the discharge state of each nozzle and to efficiently analyze the discharge failure of the liquid drop discharge head.

Since data for counting the cumulative number of dots discharged from the liquid drop discharge head in the IJ manufacturing device is output, it is possible to determine the cumulative number of discharged dots, using the data. By this, it is possible for the manufacturing device provider to know that the liquid drop discharge head in the IJ manufacturing device is at the end of its life, and to replace the liquid drop discharge head before a manufacturing problem occurs.

Since the operable state time of the liquid crystal drop discharge head is measured including the time used for actually discharging a liquid and the time for maintaining the liquid in a dischargeable state and waiting for the discharging operation, and the measured value is obtained and output, it is possible to determine the cumulative operable state time by the measured value.

By this, the manufacturing device provider warns the client not to manufacture products using the IJ manufacturing device exceeding the operable state time agreed upon in the agreement, so that it is possible to prevent improper use of the manufacturing device.

Since the count value of the number of manufactured products is output, it is possible to determine the cumulative number of manufactured products by the count value. By this, when the manufacturing device provider ascertains the actual number of products manufactured with the IJ manufacturing device by the client and charges the client in accordance with the number of manufactured products, the provider can determine whether or not the actual number of manufactured products presented by the client is correct, thereby making it possible to prevent the client from presenting an incorrect number.

Since a predetermined remaining amount of liquid in the storage container for storing the liquid is detected and a notification signal for notifying the provider that the remaining amount of liquid has decreased to the predetermined amount is output, it is possible for the manufacturing device provider to know by the notification signal that the amount of liquid in the IJ manufacturing device has decreased to a threshold amount at which the storage container needs to be replenished with liquid and, thus, to replenish the storage container with liquid before the remaining amount of liquid hinders the manufacturing operation.

Since removal of any predetermined part in the discharger is detected and a warning signal is output, it is possible for the manufacturing device provider to ascertain by the warning signal that the client has done something which may be a breach of agreement, such as the use of any part in the manufacturing device, such as the liquid drop discharge head, for other purposes or the bringing out of any part from the client's site, and to take measures against it.

The controller receives monitor data or a warning signal from the manufacturing device being monitored through the communication line, updates and records monitor data of the manufacturing device using the received monitor data, controls the maintenance and use of the manufacturing device based on the previously recorded agreement information concerning the manufacturing device and the monitor data, and outputs data regarding the manufacturing device. Therefore, the manufacturing device provider can efficiently control the maintenance and use of the manufacturing device.

Based on the content of the warning signal or monitor data, the controller outputs a command for controlling the manufacturing device through the communication line. Therefore, the manufacturing device provider can quickly take measures against the client without going to the client's site.

The controller computes the manufacturing device royalty based on the number of manufactured products obtained from the manufacturing device. By this, for example, when an agreement is made between the manufacturing device provider and an ink manufacturer to pay for the ink in accordance with the cumulative number of manufactured products rather than the amount of ink used, the manufacturing device provider can pay to the ink manufacturer for the ink from the royalty at a rate specified in the agreement. As a result, it is possible to charge the client for the ink in terms of the actual number of manufactured products instead of the amount of ink used. Therefore, for the client, the cost of using the IJ manufacturing device becomes matched to the actual number of manufactured products, so that it is easy to control costs. For this reason, the client has increased confidence in the manufacturing device provider. Even for the ink manufacturer, the ink is charged in terms of the actual number of manufactured products, so that it is possible for the client to have increased confidence in the ink manufacturer due to an efficient fee structure that does not depend on the amount of ink used.

What is claimed is:

1. A manufacturing system, located at a manufacturing system site, comprising:
 a discharger for discharging a liquid material having fluidity onto a substrate;
 communication means for transmitting and receiving data through a communication line; and
 monitoring means for monitoring the state of the discharger and for outputting data obtained by the monitoring through the communication means;
 wherein the communication means provides communication between the monitoring means at the manufacturing system site and a server located outside of the manufacturing system site, and the monitoring means receives a control command from the server through the communication means; and
 wherein the control command from the server renders the discharger inoperable when a breach of an agreement about the manufacturing system is discovered.

2. The manufacturing system according to claim 1, wherein the monitoring means determines whether or not an abnormality has occurred based on the monitor data, and outputs a warning signal through the communication means when an abnormality has occurred.

3. The manufacturing system according to claim 1, wherein when the monitoring means receives the control command through the communication means, the monitoring means controls operation of the discharger in accordance with the control command.

4. The manufacturing system according to claim 1, wherein the discharger comprises a liquid drop discharge head for discharging the liquid material, and a drive circuit for outputting a drive signal for controlling the discharging carried out by the liquid drop discharge head; and
 at least one of a drive signal input portion of the liquid drop discharge head and the drive circuit are shielded so as not to be accessible from the outside.

5. The manufacturing system according to claim 4, wherein the liquid drop discharge head is provided with a specific identification number, the discharger further comprises mounting detecting means for detecting any mounting of the liquid drop discharge head, and when the monitoring means receives a detection signal from the mounting detecting means, the monitoring means reads and outputs the identification number.

6. The manufacturing system according to claim 4, wherein the discharger further comprises discharge failure detecting means, the discharge detecting means detecting the discharging of the liquid material from the liquid drop discharge head when the drive signal is input, and a discharge failure of the liquid drop discharge head when the liquid material is not discharged; and
 when the monitoring means receives a detection signal from the discharge failure detecting means, the monitoring means determines that an abnormality has occurred and outputs a warning signal.

7. The manufacturing system according to claim 6, wherein when the liquid drop discharge head comprises a plurality of nozzles for discharging the liquid material, the discharge failure detecting means is constructed to detect a discharge failure of each nozzle.

8. The manufacturing system according to claim 4, wherein the discharger outputs a notification signal indicating the generation of a drive signal pulse, and the monitoring means outputs data for counting the cumulative number of dots discharged from the liquid drop discharge head based on the notification signal.

9. The manufacturing system according to claim 4, wherein the discharger measures an operable state time of the liquid drop discharge head, the operable state time including time for actually discharging the liquid material, maintaining the liquid material in a dischargeable state, and waiting for the discharging operation; and
 the monitoring means obtains and outputs the measured operable state time.

10. The manufacturing system according to claim 1, wherein the discharger counts the number of manufactured products, and the monitoring means outputs a count value.

11. The manufacturing system according to claim 1, wherein the discharger further comprises a storage container for storing the liquid material, and remaining amount detecting means for detecting a predetermined remaining amount of liquid material in the storage container; and
 when the monitoring means receives a detection signal from the remaining amount detecting means, the monitoring means outputs a notification signal for notifying that the remaining amount of liquid material has decreased to a predetermined remaining amount.

12. The manufacturing system according to claim 1, further comprising removal detecting means for detecting removal of any predetermined part in the discharger, wherein when the monitoring means receives a detection signal from the removal detecting means, the monitoring means determines that an abnormality has occurred and outputs a warning signal.

* * * * *